United States Patent [19]

Nelson

[11] 4,068,239

[45] Jan. 10, 1978

[54] LATENT MAGNETIC IMAGE TRANSFER METHOD AND APPARATUS

[75] Inventor: Alfred M. Nelson, Redondo Beach, Calif.

[73] Assignee: Addressograph Multigraph Corporation, Cleveland, Ohio

[21] Appl. No.: 653,664

[22] Filed: Jan. 30, 1976

Related U.S. Application Data

[62] Division of Ser. No. 490,398, July 22, 1974, Pat. No. 3,987,491.

[51] Int. Cl.$^2$ ........................ G03G 19/00; G11B 5/02; G11B 5/86

[52] U.S. Cl. ........................................ 346/74.1; 360/57

[58] Field of Search .......................... 346/74.1; 40/174; 360/57, 59

[56] References Cited

U.S. PATENT DOCUMENTS

| | | | |
|---|---|---|---|
| 2,793,135 | 5/1957 | Sims, Jr. | 346/74.1 |
| 3,717,459 | 2/1973 | McClure | 346/74.1 |
| 3,852,525 | 12/1974 | Ichioka | 346/74.1 |
| 3,935,578 | 1/1976 | Condon | 346/74.1 |
| 3,946,404 | 3/1976 | Berkowitz | 346/74.1 |

*Primary Examiner*—Jay P. Lucas
*Attorney, Agent, or Firm*—Lindenberg, Freilich, Wasserman, Rosen & Fernandez

[57] ABSTRACT

A copying machine which includes a thin flexible sheet with a layer of chromium dioxide, a lamp for shining light at the sheet and a document to be copied to form a magnetic image on the chromium dioxide layer, a drum having a layer of nickel cobalt, a transfer head for pressing the sheet against the drum while applying an anhysteretic magnetic field to them to transfer the magnetic image to the nickel cobalt, an applicator for applying toner to the drum, and a mechanism for pressing sheets of paper against the drum to transfer the toner to the paper. The nickel cobalt layer has a lower coercivity but higher remanence than the chromium dioxide, so that the magnetic field on the drum can be of greater strength than the original magnetic field on the chromium dioxide layer. Also, the nickel cobalt layer on the drum is a smooth continuous metallic layer which can perform better printing than the nonmetallic chromium dioxide particles which are held in a resinous binder on the flexible sheet.

8 Claims, 4 Drawing Figures

Fig. 2
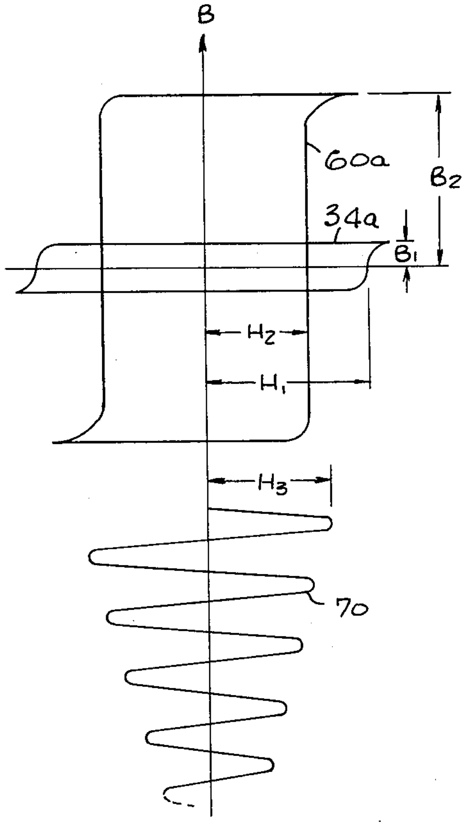
Fig. 4
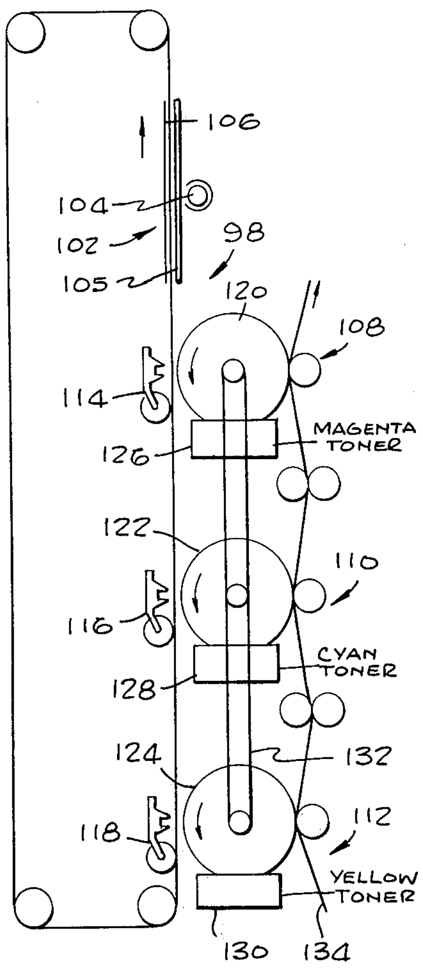
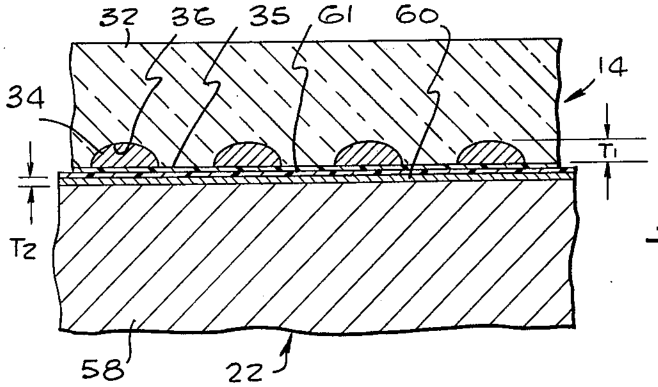
Fig. 3

LATENT MAGNETIC IMAGE TRANSFER METHOD AND APPARATUS

This is a division, of application Ser. No. 490,398, filed July 22, 1974 now U.S. Pat. No. 3,987,491.

BACKGROUND OF THE INVENTION

This invention relates to latent magnetic field copying apparatus and methods.

One recording technique which has been recently developed is thermomagnetic recording wherein a master consisting of a sheet-like base and a layer of magnetizable material, is held against an original document to be copied, and an intense light beam is directed at them. The white or clear areas of the original allow high intensity light to fall on the magnetic material and raise its temperature beyond the Curie point. The magnetic layer has been previously magnetized, and raising the temperature of certain regions beyond the Curie point demagnetizes these regions so that the only remaining magnetized regions correspond to the image on the original. The master with a magnetic image thereon can then be used for printing by applying magnetic toner to the surface, with the toner sticking only to the magnetized regions, and by then pressing the master against a sheet of paper to transfer the toner to the paper.

The development of copying machines utilizing thermographic recording is hampered by conflicting requirements of the imaging process, in which a magnetic image is formed on a magnetizable layer, and the printing process, in which toner is picked up and transferred to a sheet of paper. For example, in order to make copies from an opaque original document, a reflex imaging process is utilized in which the master is constructed to transmit light. This may be accomplished by utilizing a transparent base with many fine grooves, and by utilizing chromium dioxide particles in a plastic binder that fills the grooves but leaves the spaces between the grooves unaffected so they can transmit light. The transparent base and the chromium dioxide particles and binder may form a poor printing master for picking up toner and transferring it to sheets of paper. Also, the speed at which images can be formed on the master with moderately priced equipment may be far slower than the speed at which copies can be printed.

SUMMARY OF THE INVENTION

In accordance with one embodiment of the invention, a magnetic image copying machine is provided which utilizes two magnetic image recordings to enhance the printing capabilities of the machine. The machine includes a first magnetic record medium in the form of a strip or web. The web includes a base and a magnetizable layer thereon which are both light transmissive, to permit reflex production of a magnetic image from an original document that is to be copied. The second record medium is in the form of a drum with a layer of magnetizable material thereon, and which is designed to insure good pickup of toner and transference to sheets of paper to form good copies. The machine also includes a transfer head which holds the first, or web record, against the second, or drum record, while applying an anhysteretic field to them to form a magnetic image on the drum corresponding to the magnetic image on the web record.

The second layer of magnetizable material, which lies on the drum, has a lower coercivity but higher remanence than the first layer of magnetizable material on the web record medium. The peak magnetic field intensity applied by the transfer head is in between the coercivities of the two magnetizable materials, so that the magnetic image on the web is not erased but a magnetic image is formed on the drum. The fact that the magnetizable material on the drum has a high remanence means that the magnetic strength of the image formed on the drum can be greater than the magnetic image on the web.

The web is guided from the imaging station where it receives an image from the original, to the transfer station, along a path that includes a storage loop. As a result, the web can remain stationary or move only slowly at the imaging station and yet at the same time a portion can move rapidly or remain stationary near the drum. This permits slow imaging to minimize the illumination requirements, without preventing rapid transfer of images to the drum or the rapid production of multiple copies by the drum.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2 is a graphical representation of the magnetic characteristics of the materials on the two records utilized in the machine of FIG. 1 and of the relative strength of the magnetic field applied during image transfer between them;

FIG. 3 is an enlarged partial sectional view taken on the line 3—3 of FIG. 1;

FIG. 4 is a highly simplified sectional view of a printing machine constructed in accordance with another embodiment of the invention, wherein the machine is designed to produce color copies;

DESCRIPTION OF THE PREFERRED EMBODIMENTS

Figure 1:
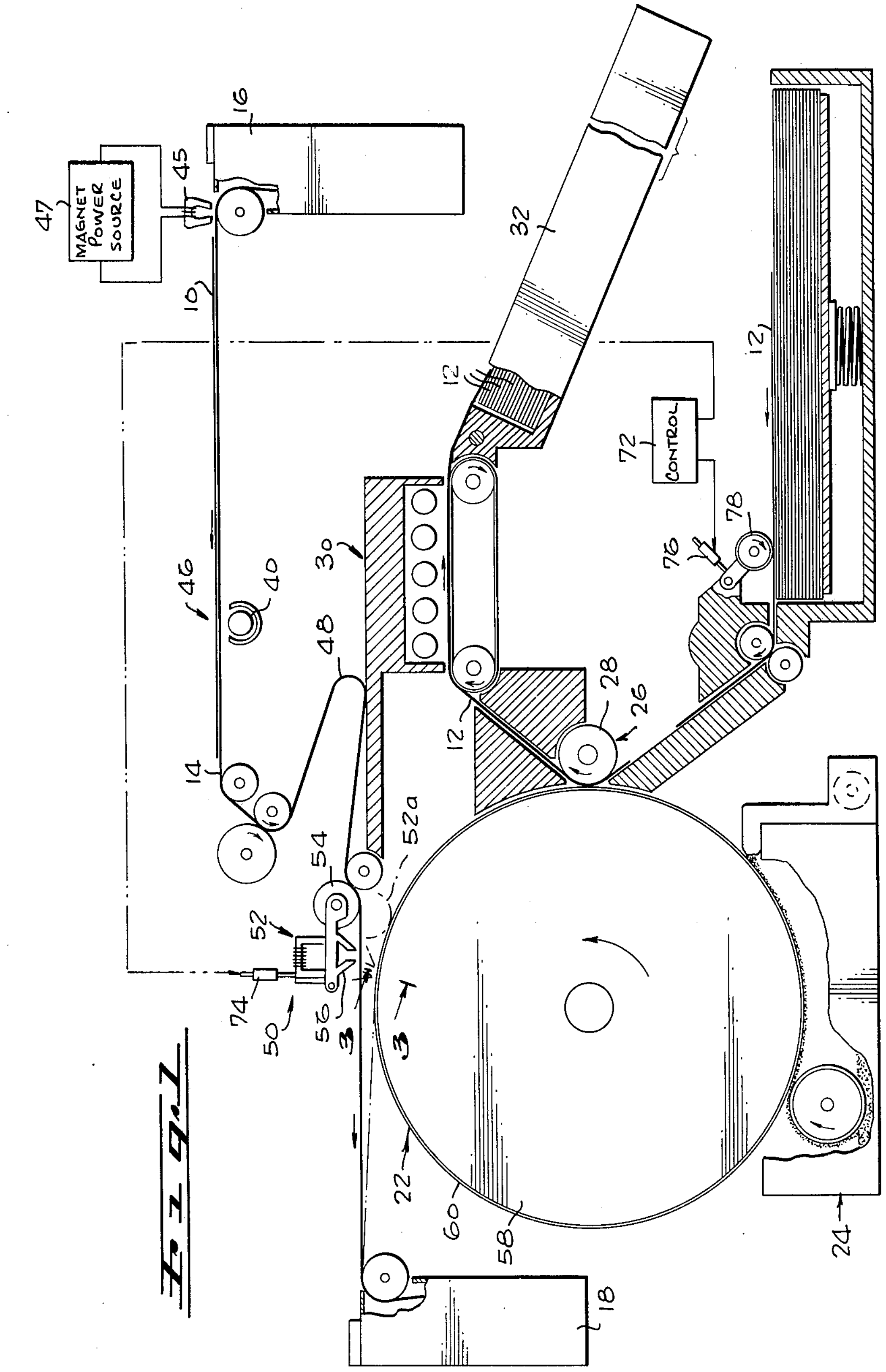
FIG. 1 is a simplified sectional view of a copying machine constructed in accordance with one embodiment of the invention.

FIG. 1 illustrates a copying or printing apparatus which makes copies from an original document 10 onto sheets of paper 12. The machine includes a first record medium in the form of a web 14, which is moved by rollers between a storage chamber 16 and a take up chamber 18, along a path that includes a station where the original to be copied is laid on the web. The web also passes adjacent to a second record medium in the form of a printing drum 22 which can receive an image from the web. As the drum rotates, an image thereon passes by a toner-applying station 24 where magnetically attracted toner particles are applied to magnetize regions of the drum surface. The toner-coated drum portion then moves past a printing station 26 where copy sheets 12 of paper are pressed against the printing drum by a roller 28. The sheets then move past a fusing station 30 where the toner is heated to firmly fuse it on the paper, and the paper then passes into an output basket 32. Of course, the copy sheets 12 can be portions of a continuous roll that may be cut after each copy is made.

The web 14, which serves as a magnetic record medium, has the form shown in the highly magnified view of FIG. 3. The web 14 includes a base in the form of a wide strip 32 of flexible transparent material such as Mylar, and an interrupted layer 34 of magnetizable material. A thin protective layer 35 of transparent material covers the layer 34. The Mylar strip 32 has numerous fine grooves 36 in one surface thereof, and the magnetizable material 34 fills the grooves. The magnetizable material may be constructed of chromium dioxide particles held in a resinous binder. This grooved arrangement, which is described in U.S. Pat. No. 3,555,557, makes the record medium 14 semi-transparent. Other web constructions can be used; for example, a continuous layer of magnetic material on a Mylar base can be etched to leave a pattern of open spaces through which light can pass.

A magnetic image is formed on the web record medium 14 in the manner shown in FIG. 1 by a lamp 40 which directs an intense beam of light through the web record medium 14 against the original document 10, while the lamp moves along the length of the original to direct the light beam at all areas thereof. The web 14 has been previously magnetized by an electromagnet 45 driven by an oscillator power source 47, as the web was drawn from the storage chamber. If the magnetic material is structured as described above, a permanent magnet or direct current magnet can be used. As light from the lamp passes through the web 14, the light raises the temperature of the magnetizable material to a level just below the Curie point. Light reflecting off white areas of the original 10 onto the web 14 further raises the temperature of corresponding regions of the web above the Curie point, and therefore demagnetizes those regions of the web. However, dark areas of the original do not reflect such light and the corresponding web areas remain magnetized. This web construction and reflex imaging method have been previously known in the art.

The web moves from the imaging station 46 along a path that includes a storage loop 48, past a transfer station 50 where the image on the web is transferred to the printing drum 22. A transfer head 52 located at the transfer station includes a roller 54 which can press the web against the surface of the printing drum 22 and an electromagnetic 56 which supplies a varying magnetic field to the web and printing drum as they lie against one another, to effeft a magnetic image transfer. The drum 22 includes a firm supportive base or backing portion 58 such as a thick cylinder of non-magnetic metal, and a thin layer 60 of magnetizable material such as nickel cobalt. A thin protective layer 60 (FIG. 3) covers the nickel cobalt layer. The characteristics of the two magnetizable materials at 34 and 60 on the web and drum, are carefully chosen to enable the transference of a magnetic image by the application of magnetic fields.

FIG. 2 illustrates the relative intrinsic magnetic characteristics of the magnetic materials utilized in the web and drum with the characteristics of the chromium dioxide material utilized on the web indicated at 34a and the characteristics of the nickel cobalt material utilized on the printing drum indicated at 60a. In the graph of FIG. 2, the intercept of the curves 34a and 60a with the horizontal axis (i.e. the value of H at B=O) indicates the field required to switch the direction of magnetization of the respective material, or in other words the intrinsic coercivity of the material. The intercept of the vertical axis B indicates the intrinsic remanence of the material, or in other, the magnetic induction remaining after the application of magnetizing fields of the intensity H. It can be seen that the chromium dioxide material 34a has a greater coercivity $H_1$ (such as 580 oersteds) but smaller remanence $B_1$ (such as 1000 gauss) than the nickel cobalt material 60*a* which has a coercivity $H_2$ (such as 400 oersteds) and remanence $B_2$ (such as 10,000 gauss). When the web 14 and drum 22 are pressed together, transference of the magnetic image onto the drum (but without erasing the magnetic image on the web) is accomplished by applying an anhysteretic field of the type indicated by waveform 70 in FIG. 2. The magnetic field 70, which is applied at virtually every point of the magnetic materials, has a maximum magnetic field strength $H_3$ which is in between the coercivities $H_1$ and $H_2$ of the two magnetic materials. As a result, the magnetic field 70 is strong enough to magnetize the nickel cobalt material 60, but is not strong enough to magnetize or demagnetize the chromium dioxide material 34. Actually, the field strength at any point of the drum surface is equal to the sum of the magnetization supplied by the anhysteretic wave 70 and the magnetic image on the web, and the field remaining on the drum after the application of the anhysteretic field corresponds to the field strength on the web. Thus, the anhysteretic field produces a magnetic image on the drum corresponding to the magnetic image on the web.

The transference of the magnetic field from the chromium dioxide web layer to the nickel cobalt drum layer can result in an enhancement of the magnetic image. This is because the nickel cobalt has a much higher remanence than the chromium dioxide, and therefore it can produce a much stronger magnetic field when magnetized to saturation. It should be noted that the intrinsic properties of the materials described are typically measured where pole effects are essentially non-influencing. Because of the fact that in this invention it is essential to provide a relatively short wave pole structure (short distance between magnetic poles) to provide surface fields that will attract toner, internal demagnetizing fields are significant. Since these fields are proportional to induction for a given wave length, the optimum thickness for maximum surface field will be thinner for the higher intrinsic induction material than for the lower induction material. Thus, in FIG. 3 the thickness $T_1$ of the chromium dioxide layer is more than twice the thickness $T_2$ of the nickel cobalt layer.

The utilization of two different magnetic record mediums 14 and 22 facilitates the copying process. The web 14 is designed especially to facilitate the imaging process. Chromium dioxide has a relatively low Curie point of about 116° C., so that heating of the web to nearly this temperature can be readily accomplished, using a base material such as Mylar for the web which can readily withstand this temperature. This oxide material is also desirable for imaging because it provides a rough, dull, grey surface that absorbs light. In addition, a binder can be utilized with the chromium dioxide to keep it in the grooves of the web, even though such a material may not be desirable in the actual pickup and printing of toner. On the other hand, the printing drum can utilize a smooth metallic layer of magnetizable materal such as nickel cobalt which provides a strong magnetic field and which constitutes a good printing surface for picking up toner and pressing it against paper. The nickel cobalt 60 can be established without grooves, since the layer on the drum does not have to be transparent, and the backing 58 for the nickel cobalt can be a rigid and opaque material, since light does not have to shine through it.

The utilization of a flexible web 14 with a storage loop 48 along its path (FIG. 1) enables flexible operation of the machine. The imaging process is normally relatively slow as compared to the speed at which multiple copies can be printed by the drum 22. Although the lamp 40 can be a very intense type to speed up the imaging, such lamps generally require large currents and expensive power supply hookups. A less intense lamp simplifies the machine, even though it slows the imaging process. However, since the imaging is separated from the printing, imaging can continue at a relatively slow speed while the printing of multiple copies can proceed more rapidly. Thus, when multiple copies are to be printed, a control 72 maintains a solenoid 74 deenergized to hold the transfer head 50 away from the drum 22 while energizing another solenoid 76 that activates a paper feeder 78. Accordingly, the drum 22 can rotate rapidly so that it rapidly picks up toner and presses it against the sheets of paper 12. When a new copy is to be printed, the transfer head 52 is moved down to the position 52a to press the web against the drum while they both move to transfer an image onto the drum. The transfer head is then retracted and the rotating drum can make multiple copies of the new image. Printing of a copy with an "old" image continues while a "new" image is being transferred onto a different part of the drum, so that there is no interruption in the paper feeding. This can simplify the paper feed control as well as increasing the throughput rate. If the imaging of an original 10 onto the web 14 is completed at a time when the drum 22 is still making multiple copies of a previous image, the portion of the web 14 containing the new image can be moved into the storage loop 48 so that another original can be copied. Then, whenever the drum 22 has finished making a run of multiple copies, the transference of a new image onto the drum can begin immediately.

Figure 5:
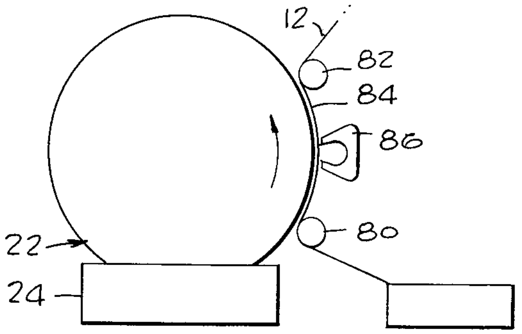
FIG. 5 is a partial sectional view of still another embodiment of the invention, wherein a magnet is utilized to facilitate the transfer of toner from the printing drum to a sheet of copy paper.

The transference of toner from the printing drum 22 to a sheet of paper 12 can be enhanced by utilizing a magnetic field that urges the toner towards the paper, as in the portion of a printer shown in FIG. 5. In this embodiment of the invention, a pair of rollers 80, 82 is provided to hold a sheet of paper 12 against the printing drum 22, and to leave an unobstructed region 84 between the rollers where the paper is held against a printing drum. A magnet 86 is positioned in this space 84, on a side of the path of the paper 12 opposite the printing drum 22, to apply a magnetic field that attracts toner particles. This helps to remove toner particles from the drum and urge them against the paper.

The magnet 86 can be of high strength to apply a powerful magnetic field at the surface of the drum 22. If multiple copies are to be made, then the magnetic field applied by magnet 86 must not be great enough to erase the image on the drum. This means that the magnetic field applied by the magnet 86 at the surface of the drum must not exceed the field strength which causes a change in magnetization of the magnet material on the drum. However, in the case of many magnetizable materials which can be utilized on the drum 22, such as a thin layer of nickel cobalt, the magnetic field strength which can be applied at the surface of the drum by magnet 86 can exceed the field strength applied by the latent magnetic image on the drum without demagnetizing the drum. Thus, the net magnetic field can urge particles towards the paper to enhance the transference of toner to the paper.

Figure 6:
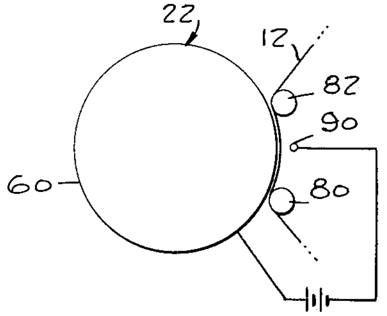
FIG. 6 is a partial sectional view of still another embodiment of the invention, wherein an electrically charged electrode is utilized to facilitate the transfer of toner to a sheet of copy paper.

The transference of toner from the printing drum 22 to a sheet of paper 12 also can be enhanced by the use of electrostatic fields, as in the portion of a printer shown in FIG. 6. Here a negative electrode 90 is charged to a high voltage relative to the surface of the drum 22 to attach toner to the paper. The fact that the drum surface layer 60 is a continuous metallic layer means that the drum surface can be easily maintained at a uniform potential to enhance the electrostatic transfer.

The utilization of magnetic image transference between a first record medium which forms an image from the original, to a second record medium which picks up toner to print the image, facilitates the design of a color copying machine 98 such as that shown in FIG. 4. The machine 98 includes a web 100 of a construction similar to that of the web 14 in FIG. 1, and which extends in a continuous loop. At an imaging station 102, a lamp assembly 104 shines light through one of three interchangeable color filters 105, such as a blue filter, and through the web 100 onto a multicolor original 106 to form a magnetic image on the web. The web is then advanced, another filter such as a red filter, is substituted, and another magnetic image is recorded on the web. This process is repeated for a third time with still another filter such as a green one. Each of the three web portions then lies adjacent to a different one of three printing stations 108, 110, and 112. At each printing station, a corresponding transfer head 114, 116, 118 moves a corresponding image-bearing portion of the web against a corresponding drum 120, 122, 124. The transfer heads then apply anhysteretic fields to form images on the drums which represent the different colors on the original document. The three printing stations 108, 110, 112 includes separate toner-applying mechanisms 126, 128, 130 that respectively apply magenta, cyan, and yellow toners to their drums. After the three images have been formed on the three drums, all three drums are rotated in synchronism by chain 132 or the like. A sheet 134 of paper is then fed successively against the drums 124, 122, 120 to print images of three different colors on the paper, to thereby form an image of the paper corresponding to the colored image on the original.

Figure 7:
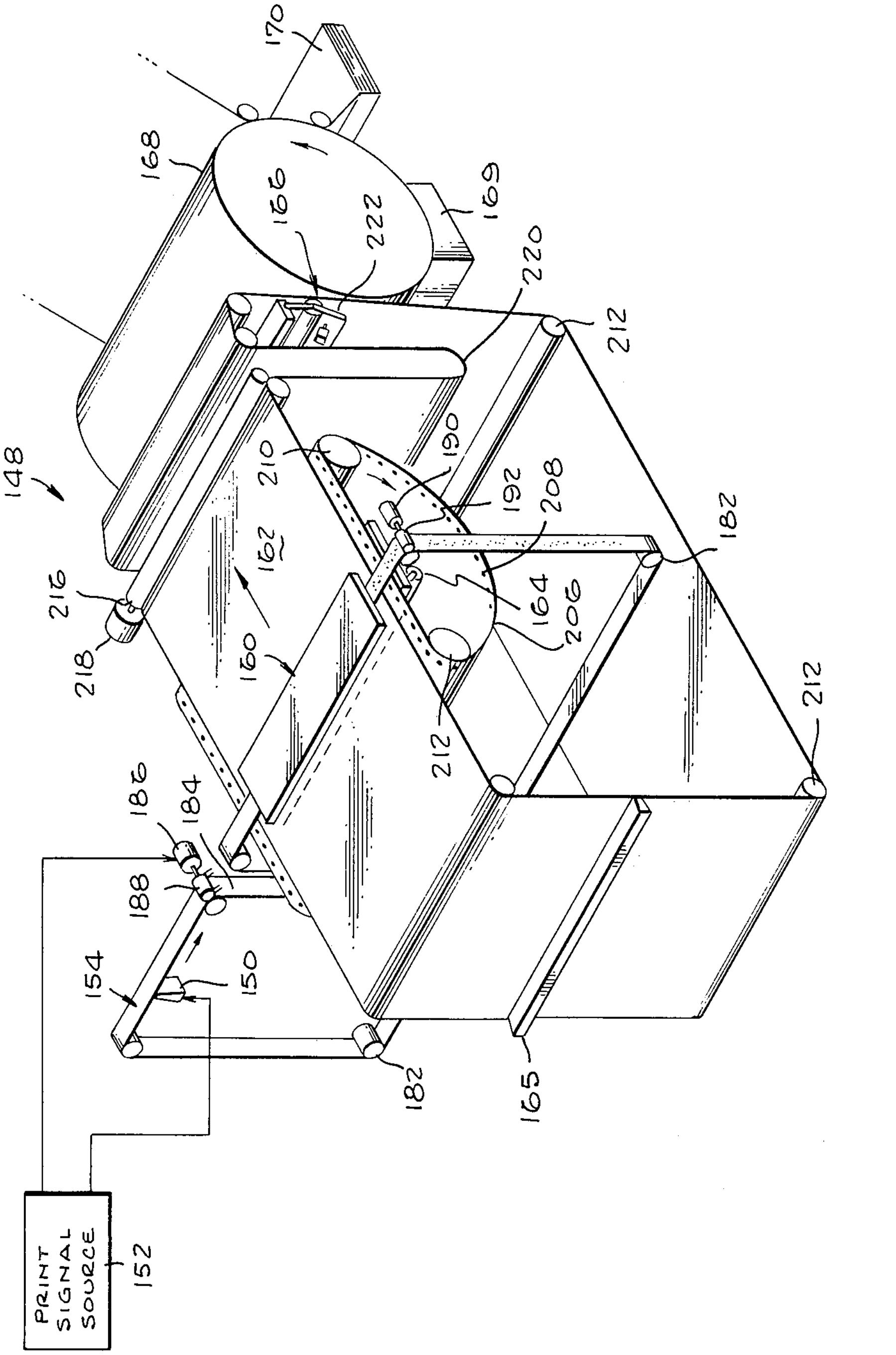
FIG. 7 is a simplified perspective view of a line printer machine constructed in accordance with yet another embodiment of the invention.

The utilization of magnetic image transference enables the construction of a line printer 148 of the type shown in FIG. 7 which utilizes a simple imaging head 150 to form characters from which multiple copy sheets are printed. Signals from a source 152 control the imaging head 150 to form magnetic images on a first strip 154, the images normally representing alpha-numeric characters such as those shown at 156 and 158 in FIG. 9. The strip 154 moves along a path past a first transfer station 160 where a line of characters on the strip 154 is transferred to a second magnetic strip 162. This is accomplished at the transfer station 160 by a flash lamp 164 which rapidly heats portions of the second strip 162 past the Curie point thereof to develop a magnetization corresponding to the magnetic images on the first strip 154. The first strip has been previously magnetized by a prerecording head 165. After a line of characters is thereby formed on the second strip 162, the first strip 154 is advanced by a distance such as 9 inches to bring a new line of characters to the transfer station 160, while the second strip 162 is advanced a small distance such as 1/6th inch so that the new line of characers can be recorded on a next line of the second strip. This procedure is continued until perhaps sixty lines have been printed on the second strip 162 to fill a length correspnding to the size of a typical sheet of paper. The second strip 162 is then advanced to a second transfer station 166 where the image on the second strip 162 is transferred to a drum 168. The image on the drum 168 is then dusted with magnetically attractive toner at a toner applying station 169, and the toner is then applied to sheets 170 to paper to make multiple copies of the image.

Figure 9:
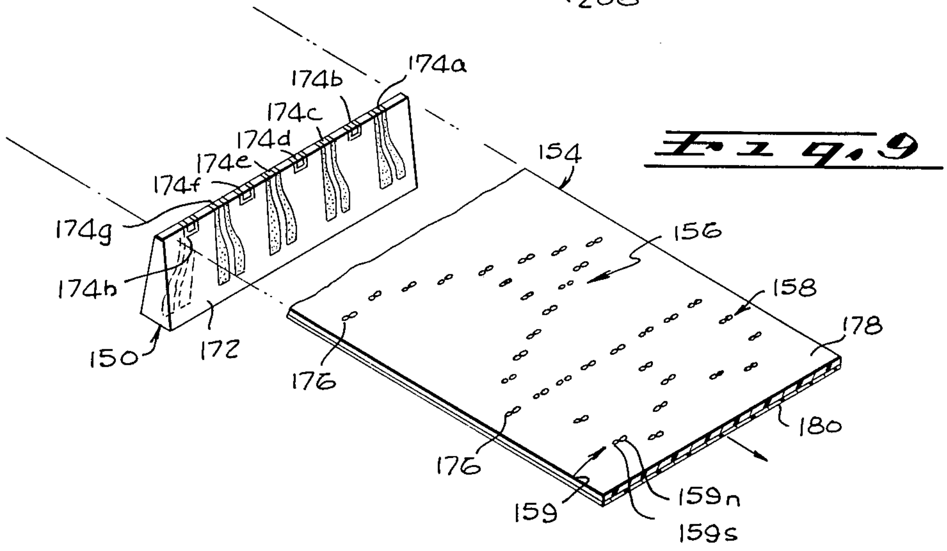
FIG. 9 is a partial perspective view of a portion of the machine of FIG. 7.

The imaging head 15, shown in detail in FIG. 9, includes a base 172 and eight conductors 174*a*–174*h* that each extend in a narrow loop around an edge of the base. Seven of the conductors 174*a*–174*g* are utilized to form small magnetized areas on the strip 154 in the manner of a dot printer, to form characters. The other conductor 174*h* is utilized to form timing and control magnetic markings 176 along the strip. Of course, current passing through any of the conductors such as 174*g*, produces a magnetic field with closely spaced poles for magnetizing the strip. The magnetic poles 159*n*, 159*s* of any spot such as spot 159, are spaced apart in a direction transverse to the length and direction of movement of the strip 154. This is desirable because the subsequent anhysteretic transfer of the image spot to the drum 168 will be accomplished with magnetic poles of the same orientation, so that the magnetizations can more definitely add and subtract. The strip 154 includes a flexible base 78 of a material such as Mylar, and a layer 180 of magnetizable material such as iron oxide particles held in a resinous binder.

As shown in FIG. 7, the first strip 154 is guided along a reentrant path by several rollers 182. The path includes a storage loop portion 184. This arrangement enables the head 150 to record asynchronously-received information onto the strip 154 at a high speed without requiring transference to the second strip 162 at a correspnding speed. As print signals are delivered to the head 150, to form localized magnetizations on the first strip, signals are also delivered to a motor 186 which turns a roller 188 to advance the first strip past the imaging head 150 and into the storage loop 184. In a similar manner, whenever it is desired to transfer the image on a length of the first strip 154 onto a line of the second strip 162, another motor 190 is energized to turn a roller 192 that advances the first strip past the transfer station 160 to bring a new portion of the first strip into position.

Figure 8:
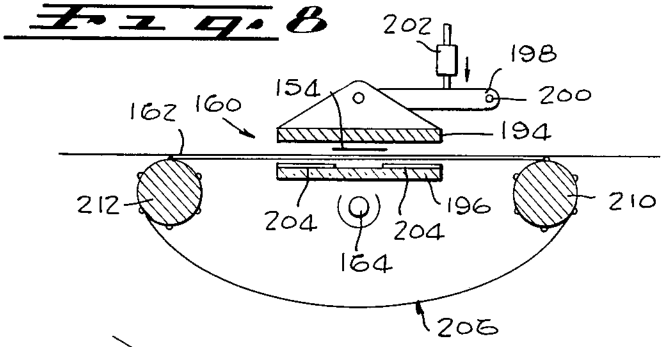
FIG. 8 is a sectional side view of a portion of the machine of FIG. 7.

The first transfer station 160, which is shown in some detail in FIG. 8, includes a pair of platens 194, 196. The upper platen 194 is attached at the end of an arm 198 pivotable at an axis 200 to enable up and down movement. A solenoid 202 can move down the arm and therefor clamp the platens together. The lower platen 196 is a glass plate to enable light from the lamp 164 to pass therethrough and heat the second strip 162. A mask 204 on the lower platen 196 serves to limit the width of the line on the second strip 162 which is heated by the flash lamp. This prevents recording of timing marks 176 along the lower edge of the first strip 154, and also prevents erasure of a previously recorded line on the second strip. The second strip 162 may be constructed of a layer of Mylar with a layer of magnetizable material such as chromium dioxide which can be readily heated to its Curie point by a flash lamp, and which has a Curie point below that of the iron oxide on the first strip 154.

The printing machine includes a form strip 206 which is utilized at the first transfer station 160 to record the image of a form on the second strip 162 at the same time as the line of characters on the first strip 154 is recorded onto the second strip. The form strip 206 may, for example, include column and row lines and a heading or other descriptive material. When light from lamp 164 is directed through the form strip 206, opaque markings on the form block the light so that corresponding areas of the second strip 162 are not heated past the Curie temperature and therefore these regions of the second strip retain the magnetization previously induced by prerecord head 165. Of course, it is necessary that the form strip 206 be accurately advanced past the transfer station 160, and this is accomplished by providing sprocket holes 208 in the form strip that are engaged by sprocketed rollers 210, 212 that are turned by a motor (not shown). The form strip 206 can be easily removed and a new form strip replaced on the rollers in order to change the format of the printout. The use of a form strip 206 generally eliminates the need for preprinted form paper on which computer printouts are often made, thereby providing a savings for the user.

The second strip 162 is guided along a reentrant path by a group of rollers 214. One of the rollers 214 which lies opposite a pressure roll 216 is driven by a motor 218 to control advancement of the second strip 162 from the transfer station 160 into a storage loop 220. An anhysteretic transfer head 222 at the second transfer station 166 can press the second strip 162 against the drum 168, so that as the drum rotates it pulls the second strip 162 out of the storage loop 220 thereof. Of course, the copy material at 170 on which copies are made can be fed from a roll, and the roll material may be cut into sheets where individual copy sheets of ordinary size are desired, or the roll can be left intact where a long sheet or strip may be utilized which may be many feet long as is often the case in computer printout.

The line printer and duplicating machine of FIG. 7 has the advantage that it can receive and print asynchronous data utilizing a single character printing device or head, or only a few character printing heads where several lines are printed on the first strip 154. This can be accomplished in a device that can then print multiple copies at high speed, utilizing a drum with a continuous metal surface layer such as nickel cobalt, for assuring good printing quality. In addition, the machine enables the automatic simultaneous generation of form outlines as the lines of characters are imaged onto the second strip or record medium 162. The transfer of images onto the second record medium is accomplished by utilizing an optical image (of the form strip 206) to selectively erase the premagnetized pattern established by magnet 165) by treating the selected areas above the Curie point and by utlizing a magnetic image (of the first strip 154) to remagnetize the second strip as it cools back down below the Curie point.

Thus, the invention provides a magnetic imaging system which separates the image process, by which a magnetic image is formed corresponding to the original, from subsequent processes such as the printing of paper with images corresponding to the original. This is accomplished by utilizing the transference of a magnetic image from a first record medium, such as a flexible web constructed to be transparent and with magnetizable material such as chromium dioxide which can be readily heated near the Curie point, to a drum containing a layer of high remanence magnetic material such as nickel cobalt backed by a stiff drum portion to permit good printing. The transference enables the utilization of highly retentive material on the drum such as nickel cobalt which may not be entirely suitable for use during the imaging process, but which can form a better printing surface and which can have a higher remanence so as to produce an even more intense magnetic image than was originally produced on the web. The separation of the imaging process from the printing process also enables imaging and printing to proceed at different speeds, which is especially useful where multiple copies are to be produced, so that relatively slow imaging does not affect the speed at which copies can be made.

Although particular embodiments of the invention have been described and illustrated herein. It is recognized that modifications and variations may readily occur to those skilled in the art and consequently, it is intended that the claims be interpreted to cover such modificatons and equivalents.

I claim:

1. A process for forming a composite magnetic image comprising:

substantially uniformly magnetizing a second record medium;

applying light in a predetermined optical image pattern to said second record medium in an intensity which raises the temperature of areas of said second medium corresponding to the image, above the Curie temperature, to thereby erase the magnetization in said areas; and allowing said second record medium to cool while holding a first record medium with a first magnetic image thereon adjacent to said second record medium, to thereby remagnetize the second record medium so that the resulting magnetic image thereon represents the combination of the optical image and first magnetic image.

2. The process described in claim 1 wherein:

said means for applying light includes briefly flashing light through a substantially transparent form onto said second record medium while holding said first record medium with said first magnetic image thereon adjacent to said second medium on a side thereon opposite said form.

3. A process for printing a composite image comprising:

forming a first magnetic image on a first record medium which has a layer of magnetizable material;

positioning a second record medium which has a layer of magnetizable material, facewise adjacent to said first record medium;

positioning a generally light transmitting form containing opaque markings thereon, on a side of said second record medium opposite said first record medium;

projecting an intense light beam through said form against said second record medium at the location where said first record medium lies against said second record medium, said beam being of sufficient energy to raise the temperature of the second record medium above the Curie temperature in areas thereof which are not obstructed by opaque markings on said form; and printing an image corresponding to the image on said second record medium.

4. The process described in claim 3 wherein:

said step of projecting a light beam is performed at a predetermined light station; and including moving said form and said second record medium parallel to each other past said light station; and moving said first record medium past said light station in a direction perpendicular to the movement direction of said form thereat.

5. The process described in claim 4 wherein:

said first record medium comprises an elongated strip, and said step of forming a first magnetic image includes magnetizing limited spot areas of said first medium with the magnetic poles of each spot area spaced from each other in a direction perpendicular to the length of said first record medium; and said second record medium comprises an elongated web and said step of printing an image includes holding said second record medium against a third record medium which has a layer of magnetizable material, while applying an anhysteretic magnetic field to them, said anhysteretic field having magnetic poles spaced from one another along the length of said second record medium.

6. Apparatus for printing a composite image representing a form and characters placed on said form, comprising:

a first record medium;

means for forming a magnetic image representing characters, on said first record medium;

a form containing markings representing the positions of characters;

a second record medium;

means for holding a portion of said first record medium which contains a magnetic image, and a portion of said second record medium facewise adjacent to each other;

means for forming a composite image representing the magnetic image on said first medium portion and the markings on said form portion, simultaneously onto said second record medium while it lies facewise adjacent to said first record medium; and means for printing onto a print medium, the composite image formed on said second record medium.

7. The apparatus described in claim 6 wherein:

said means for forming a composite image comprises light source means for shining light at said form portion, said light source means and said form being positioned so that light emerging from said form portion is incident on said portion of said second record medium which lies adjacent to said first record medium, said light source being intense enough to raise the temperature of at least some of said second medium above the Curie temperature thereof.

8. The apparatus described in claim 6 including:

means for moving said form portion and said second record medium portion parallel to one another, so that different regions of said form are imaged on different regions of said second record medium.

* * * * *